United States Patent
Jain et al.

(10) Patent No.: US 10,896,071 B2
(45) Date of Patent: Jan. 19, 2021

(54) PARTIAL READING OF INPUT FILES TO PROCESS BUSINESS OBJECTS

(71) Applicant: INTERNATIONAL BUSINESS MACHINES CORPORATION, Armonk, NY (US)

(72) Inventors: Anket Jain, Kamataka (IN); Ramkumar Ramalingam, Theni (IN); Lohith Ravi, Karnataka (IN); S. VenkataKrishnan, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 290 days.

(21) Appl. No.: 16/025,068

(22) Filed: Jul. 2, 2018

(65) Prior Publication Data
US 2018/0329760 A1  Nov. 15, 2018

Related U.S. Application Data

(63) Continuation of application No. 13/300,555, filed on Nov. 19, 2011, now Pat. No. 10,048,990.

(51) Int. Cl.
*G06F 9/52* (2006.01)

(52) U.S. Cl.
CPC ..................... *G06F 9/52* (2013.01)

(58) Field of Classification Search
CPC ........................................................ G06F 9/52
See application file for complete search history.

(56) References Cited

U.S. PATENT DOCUMENTS

| | | | |
|---|---|---|---|
| 5,946,467 A | | 8/1999 | Pathakis et al. |
| 5,956,712 A | * | 9/1999 | Bennett .............. G06F 16/1774 |
| 5,963,963 A | * | 10/1999 | Schmuck .............. G06F 9/5016 |
| 5,987,477 A | * | 11/1999 | Schmuck ............ G06F 16/1858 |
| 6,021,274 A | | 2/2000 | Reed et al. |
| 6,021,508 A | * | 2/2000 | Schmuck ............ G06F 16/1858 714/4.5 |
| 6,023,722 A | | 2/2000 | Colyer |
| 6,032,216 A | * | 2/2000 | Schmuck .................. G06F 9/52 710/200 |

(Continued)

OTHER PUBLICATIONS

Websphere Adapters in Clustered Environments, Copyright IBM 2005, 2011.

(Continued)

*Primary Examiner* — Benjamin C Wu
(74) *Attorney, Agent, or Firm* — Michael O'Keefe (57) ABSTRACT

A high availability environment of resource adapters implements processes to manage and to distribute work among the adapters or adapter instances. An input resource, such as a file, is received and tasks are created to distribute the content to the different instances of the adapters that are configured in the cluster. A resource adapter instance switches to manage the creation of the task based on task-definitions of the adapter. The task-definitions are rules specified in the adapter on chunks of data. The tasks are created such that chunks of data are independently locked and processed without duplication. In order to distribute the work, the tasks are persisted into a table/xml on a persistent disk. The remaining instances interact with the table to access the tasks specified by the entries in the table, thus executing the tasks.

18 Claims, 6 Drawing Sheets

(56) References Cited

U.S. PATENT DOCUMENTS

| | | | |
|---|---|---|---|
| 6,104,962 A | 8/2000 | Sastry | |
| 6,223,205 B1 | 4/2001 | Harchol-Balter et al. | |
| 6,292,822 B1 | 9/2001 | Hardwick | |
| 6,321,373 B1 | 11/2001 | Ekanadham et al. | |
| 6,347,253 B1 | 2/2002 | Fujita et al. | |
| 6,557,168 B1 | 4/2003 | Czajkowski et al. | |
| 6,609,213 B1* | 8/2003 | Nguyen | G06F 11/2025 709/223 |
| 6,708,331 B1 | 3/2004 | Schwatrz | |
| 7,174,381 B2 | 2/2007 | Gulko et al. | |
| 7,757,236 B1 | 7/2010 | Singh | |
| 7,822,728 B1* | 10/2010 | Chandler | G06F 16/1774 707/704 |
| 10,048,990 B2 | 8/2018 | Jain | |
| 2003/0028695 A1* | 2/2003 | Burns | G06F 16/1774 710/200 |
| 2004/0133652 A1* | 7/2004 | Miloushev | G06F 11/1076 709/214 |
| 2005/0066064 A1 | 3/2005 | Micheal et al. | |
| 2005/0080933 A1 | 4/2005 | Herring | |
| 2006/0064554 A1* | 3/2006 | Fridella | G06F 3/0637 711/152 |
| 2006/0080435 A1 | 4/2006 | Tankov et al. | |
| 2006/0212496 A1* | 9/2006 | Romine | G06F 16/289 |
| 2007/0198792 A1* | 8/2007 | Dice | G06F 12/0815 711/163 |
| 2008/0052475 A1 | 2/2008 | Rang et al. | |
| 2009/0106260 A1 | 4/2009 | Eshwar et al. | |
| 2010/0186020 A1 | 7/2010 | Maddhirala et al. | |
| 2011/0055845 A1 | 3/2011 | Nandagopal et al. | |
| 2012/0011519 A1 | 1/2012 | Ganesh | |
| 2012/0320051 A1 | 12/2012 | State et al. | |

OTHER PUBLICATIONS

Mansour, M. et al, I-RMI: Performance Isolation in Information Flow Applications, College of Computing, Georgia Institute of Technology, Atlanta, GA, G. Alonso (Ed.): Middleware 2005, LNCS 3790, pp. 377-391, 2005.

Yong, N. et al, White Paper: Using WebSphere Adapter in WebSphere High Availability Environment, IBM Software Group.

Scaled-Out Receiving Hosts, Microsoft, Copyright 2010.

IBM: List of IBM Patents or Patent Applications Treated as Related (Appendix P), Jun. 23, 2020, pp. 1-2.

* cited by examiner

PARTIAL READING OF INPUT FILES TO PROCESS BUSINESS OBJECTS

CROSS-REFERENCE TO RELATED APPLICATION

This application is a continuation of U.S. patent application Ser. No. 13/300,555, which was filed on Nov. 19, 2011 and was entitled "Work Distribution and Management in High Availability Cluster Environment of Resource Adapters."

BACKGROUND

The present invention relates to high availability support by resource adapters in a cluster environment and more specifically to enabling high availability of resource adapters in a cluster environment by distribution of resources over the elements or instances in the cluster.

A resource, such as a file to be processed by an adapter, in connectivity-oriented middleware is used with runtime servers, such as a process server or application server environment. There are multiple deployment options and approaches for using such adapters in high availability environments for these servers. The deployment, however, of adapters in high availability environments may result in decreased capabilities.

File adapters can have various system based limitations while dealing with relatively large files for a particular system. An adapter in a certain system may run out of memory when processing a resource having a relatively large size where the memory of the virtual machine or the Operating System runtime becomes insufficient in that system for loading the resource to process it at once. Thus, a relatively large resource overloads the capabilities of the adapter. An adapter also may lack the intelligence in sharing such a job of file reading when deployed in a cluster environment. Thus, relatively large files present problems when being handled by such adapters within a server environment.

BRIEF SUMMARY

As described herein, the invention may be embodied in various forms, including system, devices, methods and articles of manufacture. The embodiments provided herein are illustrative and not limiting, and may be adapted in-part or combined, all while staying within the spirit and scope of the invention.

According to embodiments, a method for work distribution and management in a high availability cluster environment of resource adapters is disclosed. The method may include creating one or more tasks based on task definitions defined by the adapter using a resource adapter. A resource adapter instance may switch to manage or create the one or more tasks in order to distribute the end-to-end processing tasks such that the tasks can be mutually independent to each other locking partial content of the input resource such as a file which can be distributed. In other words, the disclosed embodiments build intelligence on work distribution by creating tasks based on the set of task definitions, defined by the resource adapter.

According to embodiments, the method may also include locking partial content of an input file for distribution in the high availability cluster environment across different resource adapter instances. Here, a plurality of partial contents of the input data may be identified and associated with the one or more tasks maintained in a table. The method may also include, in a parallel manner, accessing a different part of the plurality of partial contents of the input data by another resource adapter instance.

Further, according to embodiments, a work distribution and management device for a high availability cluster environment of resource adapters also may be provided. The device may include a bus, a memory coupled to the bus, and a microprocessor coupled to the bus. The microprocessor is programmed to create one or more tasks using a resource adapter instance of a resource adapter. A resource adapter instance switches to manage or create the one or more tasks. The adapter drives the microprocessor to lock partial content of an input file for distribution in the high availability cluster environment across different resource adapter instances. A plurality of partial contents of the input data may be identified and associated with the one or more tasks maintained in a table. Also, the microprocessor may be programmed to allow parallel access to a different part of the plurality of partial contents of the input data by another resource adapter instance. The embodiments also include maintaining the offset of processed content of a resource on the disk, which acts as a reference for the instances of resource adapters to access the data in order to process in distributed environments.

Further, according to the embodiments, an article of manufacture may be provided. The article of manufacture may include a computer readable storage medium. The storage medium contains instructions (definitions), which when executed, may cause a resource adapter or microprocessor to create one or more tasks using a resource adapter instance of a resource adapter. Thus, in embodiments, a resource adapter instance may switch to manage or create the one or more tasks. The instructions may also cause the resource adapter or microprocessor to lock partial content of an input file for distribution in the high availability cluster environment across different resource adapter instances. In embodiments, a plurality of partial contents of input data may also identified and associated with the one or more tasks maintained in a table. These instructions may also cause the microprocessor to allow parallel access to a different part of the plurality of partial contents of the input data by another resource adapter instance. Thus, the distribution of a serial-resource, such as a file, across multiple adapter instances parallel to process independently is achieved by locking and processing the associated contents.

DETAILED DESCRIPTION

Various embodiments for work distribution and management in a high availability cluster environment of resource adapters are provided herein. The invention may be reflected in these embodiments, portions of these embodiments, combinations of these embodiments, and other embodiments as well.

As disclosed herein, the embodiments enable high availability active-active support in a cluster environment. The overall architecture shown may be followed in products for high availability active-active support, which needs distribution of resources over the elements or instances of a cluster. A resource adapter may be implemented to provide support for distribution of these resources. The resource adapter may also be referred to as a flat-file resource adapter.

A resource adapter may be any application that performs a job with content of the resources, or files, received. Tasks, such as parsing content of a resource, can be defined by a resource adapter. A resource adapter may access from a microprocessor getting programmed to access files or memory locations to application layer resource processing software.

The disclosed embodiments provide two solutions to the problems encountered when deploying resource adapters in a high availability environment. An adapter may be given an option to select the type of handling based upon defined requirements. The adapter uses the disclosed processes to handle high availability active-active configurations.

One process may be known as a task-based handling process. An instance in the cluster adopts the managing task to become a task manager, and make work items, or tasks. The tasks, or work items, may be defined in each instance with specific task identification. Other instances of resource adapters within the cluster that encounter a task in a task-table may complete the task and move up to take the next task.

The disclosed embodiments implement the task definition to manage how the work is distributed and how work is managed for each instance. The managing task created based on this task definition is the first task to be executed by the resource adapter which starts executing the work coming from the adapter pool. The task entry may be removed when the current task and successive "m" tasks are completed. The designator "m" may be known as the recovery information point, and may have a value of 1 or more.

Thus, in embodiments, the various instances in the cluster will not pickup or process the same part of the resource. The cumulative distribution of the resource over the elements in the cluster can result in the same resource not being processed by two different instances. Further, all instances in the cluster may be kept busy, and recovery services may be provided for resource distribution.

The task-based handling process delivers events to the endpoints as quickly as possible. It may also increase the performance of parallel inbound resources, regardless of whether deployed in a clustered or non-clustered environment. The disclosed process may also automatically take care of cyclic and non-cyclic modes of operation. The disclosed process may also achieve consistent performance independently of the size of the incoming resources. It may also eliminate the need for reading the complete resource at once in the beginning of the process, which increases processing time. Thus, in embodiments, parallel file processing and granulating in a parallel fashion may occur when dealing with multiple resources in a clustered environment.

Embodiments may also include offset sharing processes. These offset sharing processes may provide intermediate persistent file tables that store the offsets of a file along with its current status to enable multiple instances to share the job of reading and process the files equally and in parallel. Thus, work may be distributed across multiple instances running in a clustered environment. Further, in embodiments, reading a single file with multiple instances in a clustered environment may be shared across clusters.

In embodiments, the file offsets are the file pointer positions of the file. Here, the file table may maintain the last pointer position of the file until which the reading of the file is completed by a particular instance of the file adapter. In so doing, other instances of the file, or resources, adapted in the clustered environment, may start reading the file from the last pointer position.

The file status in the file table may indicate the status of the file at various file processing stages like unprocessed, in-process, processed, failed, and the like. By allowing that maintenance of the status of the file, other instances in the clustered environment may receive an indication as to whether the file is ready for further processing.

The disclosed embodiments, therefore, can provide the following features: (a) the same resource is not processed by two different clusters; (b) all instances are kept busy in the cluster; (c) the offset sharing process may allow recovery of an incomplete task by other active instances delivery of events to the endpoints as quickly as possible; and (d) the adapter may handle files of any size.

Figure 1:
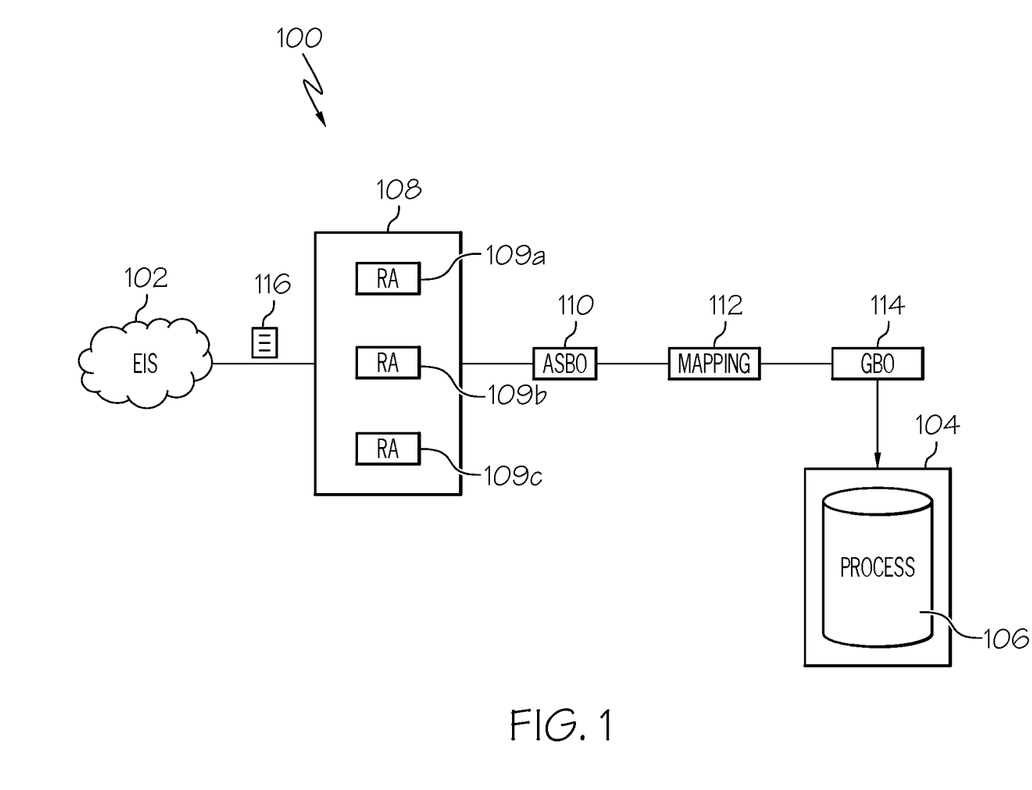
FIG. 1 illustrates a system having a high availability cluster environment of resource adapters according to embodiments.

To implement these processes, the resource adapters may be deployed or configured in a clustered environment. An example of such an environment is shown in FIG. 1, which depicts a system 100 according to the disclosed embodiments. System 100 includes enterprise information system 102 that exchanges data and information, preferably in the form of business objects, with process server 106 supported by platform 104. Although a single server 106 is shown, platform 104 may support multiple servers. Businesses may use these platforms to link different enterprise components across a wide spectrum of hardware and applications that are part of their daily operation.

System 100 also includes resource adapter cluster 108. Resource adapter cluster 108 enables bidirectional connectivity and data exchange between enterprise information system 102 and components supported by platform 104. Resource adapter cluster 108 allows integration between the generic data format used in the server business component and the application specific data format of enterprise information system 102. For example, data may flow through resource adapter cluster 108 between enterprise information system 102 and process server 106 in a bidirectional manner. With the connectivity and transformation provided by resource adapter cluster 108, the business process may focus on the business logic because the integration and communication logic with enterprise information system 102 is completed by the adapters and is transparent.

Resource adapter cluster 108 includes a plurality of resource adapters, such as resource adapter 109*a*, 109*b* and 109*c*. Any number of resource adapters may be deployed. Instances may occur on resource adapters 109*a-c*. Alternatively, a single resource adapter 109 may be used in place of resource adapter cluster 108. Thus, the adapters may be configured in a clustered or non-clustered environment.

In a high availability environment, the high availability of the enterprise solution is important. Within system 100, the availability of an adapter application or function can be critical to the whole integration solution. Whenever the adapter function is not available, the interaction and communication with enterprise information system 102 breaks. This failure impacts the normal running of the integration solution and may lead to a break in business operations as well as an uncountable loss for customers.

Because of the importance of the adapter function in such an environment, a preferred practice is to deploy resource adapters in a cluster to provide the adapter function within system 100. If one adapter shuts down, then another adapter within the cluster may provide the functionality needed. Further, large files of data may be distributed amongst the cluster to ensure prompt processing. Thus, while a single resource adapter 109a may be used within system 100, resource adapter cluster 108 may provide higher availability or improved functionality.

In use, a resource, such as an input file 116, is generated and forwarded by enterprise information system 102 to resource adapter cluster 108. Input file 116 may not be limited in size and includes data. Resource adapters 109a, 109b or 109c process input file 116 and generate application-specific business objects 110. Mapping module 112 then generates generic business objects 114 for receipt by process server 106. The reverse process may be used when sending files to enterprise information system 102.

Thus, resource adapters 109a-c within resource adapter cluster 108 process a received resource to deliver it to other elements within system 100. These elements may be known as endpoints for receipt or may be a table with entries of processed data.

Figure 2:
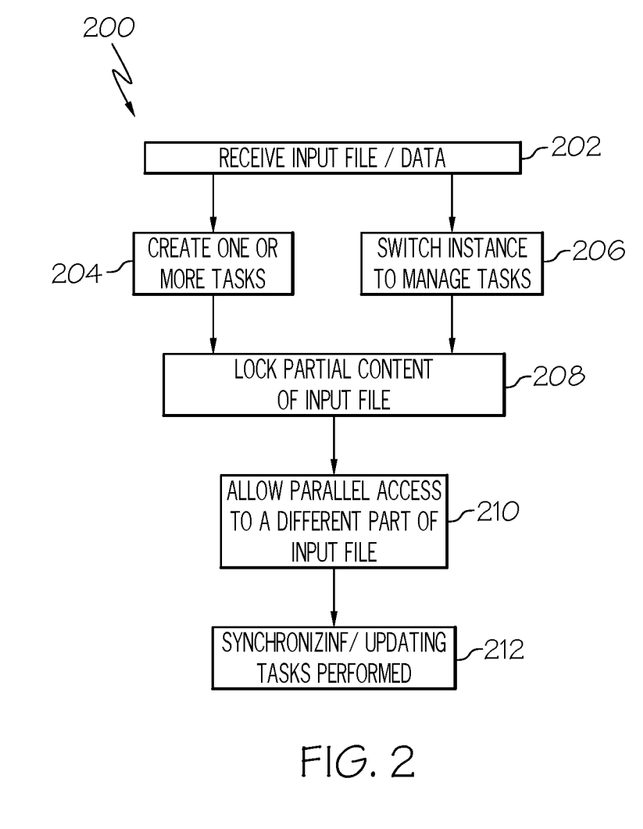
FIG. 2 illustrates a flowchart for work distribution and management in a high availability cluster environment of resource adapters.

The disclosed embodiments may also provide approaches to enable the resource adapters to handle files of any size, such as 100 megabytes (MB) or even 1 gigabyte (GB) in an effective manner. FIG. 2 depicts a flowchart 200 for work distribution and management in a high availability cluster environment of resource adapters. FIG. 2 refers to elements shown in FIG. 1 for clarity but is not limited to the features of FIG. 1.

Step 202 executes by receiving an input file 116 or data at the resource adapter cluster 108. Alternatively, input file 116 may be received at a single resource adapter. Input file 116 may be any size. Step 204 executes by creating one or more tasks to be completed in processing input file 116 by resource adapter cluster 108. The tasks may be associated with parts, or partial content, of input file 116.

Step 206 executes by switching an instance on one of the resource adapters within cluster 108 as a managing instance for subsequent operations. Alternatively, a resource adapter may be switched to a managing adapter for the cluster. Additional processes for choosing a managing entity are disclosed below, and may be incorporated in this step even though such functions may occur in the subsequent processing steps. Steps 204 and 206 may be executed simultaneously or in sequence, such that the managing entity creates the tasks to be executed. Further, step 206 may be executed as part of the processing steps.

Step 208 executes by locking partial content of input file 116 for distribution. Thus, the full file is not locked for processing. This feature also avoids duplication of the work across different instances or adapters in the cluster. The partial contents of the input file may be identified based on segregation of the one or more tasks, user defined configurations or states maintained in an offset table. These features are disclosed in greater detail below.

Step 210 executes by allowing parallel access to a different part of input file 116 by one or more instances or adapters because of the avoidance of the full size of input data 116 being locked. Thus, multiple instances or adapters may process input file 116 with resource adapter cluster 108 at once. Step 212 executes by synchronizing or updating the tasks performed by the different adapters of resource adapter cluster 108. The step also includes independently segregating the tasks executed in parallel based on the dependency task completion or a user configuration.

The execution of these steps may be facilitated with the use of tables. Embodiments using these tables are disclosed below. The disclosed tables enable partial reads of contents of a large input file, or partial contents, and allow parallel processing or reading of these contents while locking out other entities within the cluster from duplicating these efforts. The tables may be used to synchronize the states of the partial contents during processing, the current tasks being processed by the adapters, and the like. The tables may also help in distributing content without duplication of efforts, and for successive archival and processing of input file 116.

Different processes may be implemented for executing steps 204-210 of FIG. 2. These processes are not meant to replace the features disclosed above, but provide more detail with regard to how to implement the steps shown in FIG. 2. The processes may be selected by a user or configured to be adapted by a cluster of resource adapters while in a high availability environment.

Figure 3:
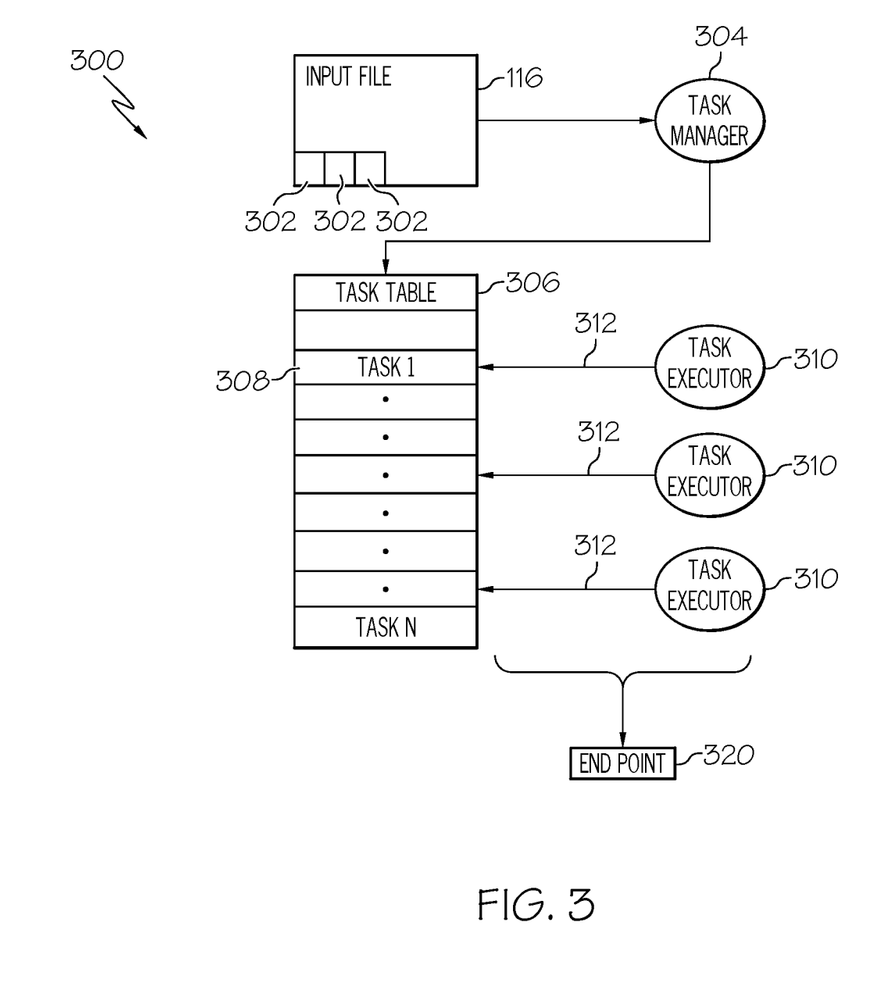
FIG. 3 illustrates a task-based handling system for a cluster of resource adapters according to embodiments.
Figure 4:
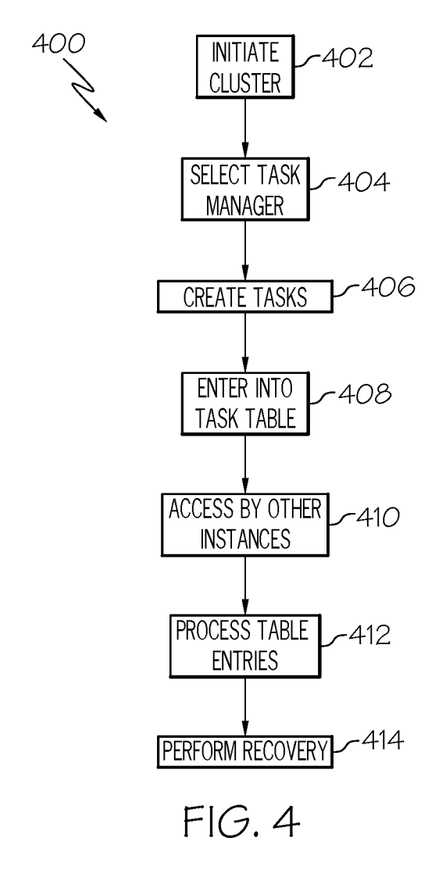
FIG. 4 illustrates a flowchart for task-based handling of an input file according to embodiments.

Embodiments of one process are shown in FIGS. 3 and 4. This process may be referred to as task-based handling. Task-based handling seeks to distribute input data by creating granules, or partial contents, of work so that all instances or adapters in a cluster are busy. The task-based approach appoints an instance to take up a managing task, and make work items. The work items are defined in each instance with a specific task identification. Task executors will encounter the tasks and appropriate task identifications in a task table and will complete the tasks. After completion of a task, a task executor moves to process the next task.

FIG. 3 depicts a task-based handling system 300 for a cluster of resource adapters according to the disclosed embodiments. System 300 also may be application to an adapter having a plurality of instances running thereon. Hereafter, instance may be used in place of adapter, but embodiments also include use of an adapter or cluster of adapters to perform the same functions disclosed below.

Task-based handling system 300 includes a task manager 304 that receives input file 116 and a table 306. It also includes task executors 310. Task manager 304 and task executors 310 may be resource adapters or instances within a cluster, such as resource adapter cluster 108. Task manager 304 may be a task executor 310 switched to manage tasks in table 306. Table 306 may be known as a task table. Input file 116 may be broken into partial contents 302. Partial contents 302 also may be referred to as parts or partial files of input file 116.

Task manager 304 overlooks the processes and creates tasks 308 for other instances in the cluster. Tasks 308 may be entered into task table 306. Task table 306 is maintained to organize the tasks. Task table 306 may be a RDBMS entity, but also may be an XML entity as well. Task pointers 312 may be associated with each instance that is running as a task executor 310. A task pointer 312 may point to a task 308 in table 306 that currently is associated by the adapter instance to process.

Each task 308 that can be maintained by an instance is defined and given identification. In other words, a task 308 includes a task identification that defines what the instance picking up the task is supposed to do. Task definitions, disclosed in greater detail below, are used in this process. A role may be defined for task executor 310 to perform. Task manager 304, in contrast, analyzes the actual inputs, creates tasks and enters the task manager table. This role, however, also may defined by a task identification when applied to an instance when input file 116 is first received.

In the disclosed resource adapters, the following roles for the instances may be defined and identified by a task identification in a task 308 within table 306. First, a resource adapter instance may determine business objects from input file 116. Roles also include the entry of records to a table or processing entries from the table. Other roles are archive and recover.

Once tasks 308 are completed, they may be delivered to end point 320. An end point may represent another element in system 100. End point 320 also may be an event table for receiving processed data from resource adapters in a high availability environment.

FIG. 4 depicts a flowchart 400 for task-based handling of an input file according to the disclosed embodiments. For clarity, reference may be made to elements of FIG. 3 in disclosing FIG. 4, but FIG. 4 is not limited by the embodiments shown in FIG. 3. Step 402 executes by initiating the cluster of resource adapters or instances, such as resource adapter cluster 108. Further, the table may be loaded or configured in order to list and enter tasks.

Step 404 executes by selecting task manager 304. Initially, there will be a task called "manager" in table 306 by default when the cluster is initiated in step 402. The adapter, or instance, that first comes in may take this task. Step 406 executes by creating tasks 308 with task manager 304. Task manager 304 may receive input file 116, determine the size of the file and create tasks 308 based on the size. Task manager 304 may create entries to task table 306 to handle the data within input file 116. For example, task manager 304 may break input file 116 into partial contents 302 for processing by task executors 310.

Step 408 executes by entering tasks 308 into task table 306. For each entry that is made, task manager 304 may update a manager-entity table. After input file 116 is analyzed, task manager 304 starts making tasks based on the data from input file 116. Step 410 executes by accessing task table 306 by other instances, such as task executors 310. Here, instances or adapters in resource adapter cluster 108 process tasks 308 associated with the table entries and deliver to end point 320. Task executors 310 may enter a timestamp to table 306 when a task is taken.

Step 412 executes by processing table entries. Task executors 310 may update timestamps as-needed, and set status flags within table 306 upon completion of a task. Tasks 308 are shifted during processing. One adapter may stop the other adapters while executing the task, but this does not impact the overall delivery from a cluster. After tasks 308 are completed, table entries within task table 306 may be archived by using an archive task. The archive task archives all files that are marked as a success in task table 306.

Step 414 executes by performing a recovery task as well, based on entries in table 306. Task definition for recovery may be performed when one adapter instance is holding a task 308 for more time than allotted. In other words, the adapter instance crosses a threshold time for completing the task. Another adapter encountering the recovery task checks is task 308 in table 306, which are taken by other instances, are being timely processed. If not, then a check is made to whether the adapter is down or not. The checking adapter may take up the outstanding task and put the down adapter back in the pool by releasing the task from it.

Further, the manager entity status may be updated to unavailable, and the manager task is added to table 306. Thus, when a new file is received, a different adapter or instance may take up the manager task. The manager function according to the disclosed embodiments is distinguishable from a master-slave relationship between adapters or instances. In other words, in the disclosed process, an instance creates tasks to manage the workload to the other instances, but does not directly manager those instances.

An example of table 306 is shown below as Table 1. Task definitions may be various kinds and may be specific to the type of resource adapter. General tasks, such as those shown below, are defined, and should include manage and recovery. Within the example, tasks 308 may be defined as follows:

Task 1—make entries to table 306
Task 2—process table entries and deliver to end point 320
Task 3—recovery
Task 4—archive
Task 5—select manager

TABLE 1

| Adapter ID | Task ID | BO number 1 Or start offset | BO number n Or end offset | Event File Name | Status flag | Timestamp |
|---|---|---|---|---|---|---|
| Adapter 1 | Task1 | 0 Mb | 25 Mb | File 1.txt | 0 | <time stamp updated when task is taken> |
| Adapter 2 | Task1 | 25 Mb | 50 Mb | File 2.Txt | 0 | |
| ... | ... | ... | ... | ... | ... | ... |
| Adapter 3 | Task 2 | File1_t_0 | File1_t_100 | Null | 0 | <time stamp updated when task is taken> |
| ... | ... | ... | ... | ... | ... | ... |
| Adapter 2 | Task 3 | All avail | All avail | Null | 0 | <time stamp updated when task is taken> |
| Adapter 4 | Task 4 | All avail | All avail | Null | 0 | <time stamp updated when task is taken> |
| Adapter 3 | Task 3 | All avail | All avail | Null | 0 | <time stamp updated when task is taken> |
| Adapter 1 | Manage | last details | last details | last details | 0 | <time stamp updated when task is taken> |

Task-based handling, therefore, allows task manager 304 to divide input file 116 into more manageable partial contents 302. Task manager 304 enters tasks 308 associated with each partial content 302 into task table 306. Other adapters or instances within resource adapter cluster 108 then take up each task. For example, for a 1 GB file, the tasks for reading different chunks of the file are defined. Task executors 310 will have simultaneous access to the 1 GB file, but there will be no duplication of processes. Further, each instance does not have to wait for another in the cluster to complete its task before starting its task. Thus, all components within a cluster are kept busy and work balance maintained.

Another process according to the disclosed embodiments for work distribution and management in a high availability cluster environment of resource adapters is an offset sharing process. The offset sharing process implements an intermediate persistent file table that stores the offsets of the input file along with its current status to enable multiple instances to share the job of reading and processing the file in an equal and parallel manner. Thus, work is distributed across multiple instances running in a clustered environment. The disclosed embodiments allow sharing of the job of reading a single file with multiple instances in a clustered environment.

Figure 5:
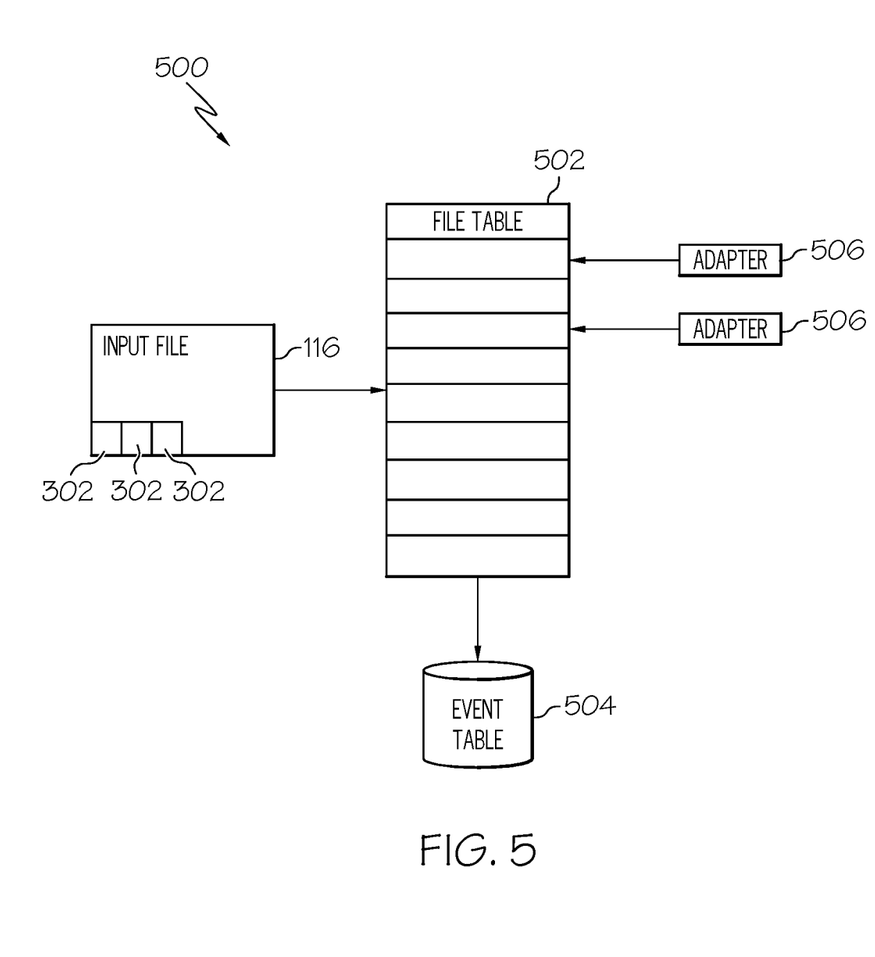
FIG. 5 illustrates a system for implementing an offset sharing process according to embodiments.

FIG. 5 depicts a system 500 for implementing an offset sharing process according to the disclosed embodiments. Input file 116, as disclosed above, may include partial contents 302. File table 502 is used to process input file 116 across a clustered or non-clustered environment. File table 502 may be an in-memory or database file table that records the current status of a file. File table 502 also allows only a partial read of input file 116 for processing and delivering of business objects as desired by a polling entity to event table 504. Event table 504 also may be known as an end point for delivery.

The disclosed embodiments introduce file table 502 to support an adapter 506 within a cluster to read only those partial contents 302 of input file 116 required by the polling entity, and keeps track of the last business object count and the last file pointer position reached after the partial read. With the file table approach, file table 502 maintains one record for each file that is processed.

Adapters 506 shown in FIG. 5 may represent a cluster of adapters. Alternatively, adapters 506 may be instances on an adapter. These adapters are similar to adapters 109a-c in resource adapter 108 shown in FIG. 1. Moreover, a single adapter 506 may be used with a plurality of instances to provide the desired functionality.

An example of file table 502 is shown below in Table 2. File table 502 may include status messages used to update and indicate the status of various tasks being completed by adapters 506, and are disclosed in greater detail below. File table 502 may be used either as an in-memory model for an adapter in a single instance scenario, or as a database persistence model for a clustered environment with multiple instances. BO stands for business object.

TABLE 2

| Filename | Status Code | Last BO Count | Last File Pointer | Timestamp |
|---|---|---|---|---|
| Represents the event filename that needs to | 0 - unprocessed 1 - in-process 2 - events updated 3 - processed | Represents processed BO count for current | Represents the end position of current | Represents the time when the file is picked |

TABLE 2-continued

| Filename | Status Code | Last BO Count | Last File Pointer | Timestamp |
|---|---|---|---|---|
| processed for BO's | 4 - failed | read | read as file pointer | up for reading |

Definitions for the status codes used in Table 2 are shown in Table 3 below. Additional statuses may be used as needed.

TABLE 3

| Status Code | Description |
|---|---|
| 0 - unprocessed | A file with status '0' represents a new file entry. An adapter polling the event directory for new files is responsible for making this entry, only one entry per file available in the event directory is allowed. NOTE: At this status, the Last BO Count and Last File Pointer Position are 0. |
| 1 - in-process | A file with status '1' represents that an adapter is currently in the process of reading this file for its content, so no other adapter is allowed to process the same file for the time being. When an adapter marks the status as '1' for the file, it also updates the timestamp to specify the time it started to read the content. |
| 2 - events updated | Once the adapter finished reading part of the file as required by the polling quantity, and after having been successful in generating new events for the current set of BO's read, the status of the file will be updated as '2'. NOTE: At this status, the Last BO Count and Last File Pointer Position are updated as per the current read. For example if the adapter reads first 10 BO's then the last BO count is indicated as 10. |
| 3 - processed | When EOF file is reached while reading the file, the file status is updated as "3". This status is an indication that, there is no more BO to be read from the file for processing. NOTE: When an adapter operates in non-cyclic mode; the status of the file is shown as '2', even when the EOF is reached, this helps to process the file again to check for new updates to the file. |
| 4 - failed | Failed to read the file, because of some unexpected error. File might be corrupt or invalid. |

Figure 6:
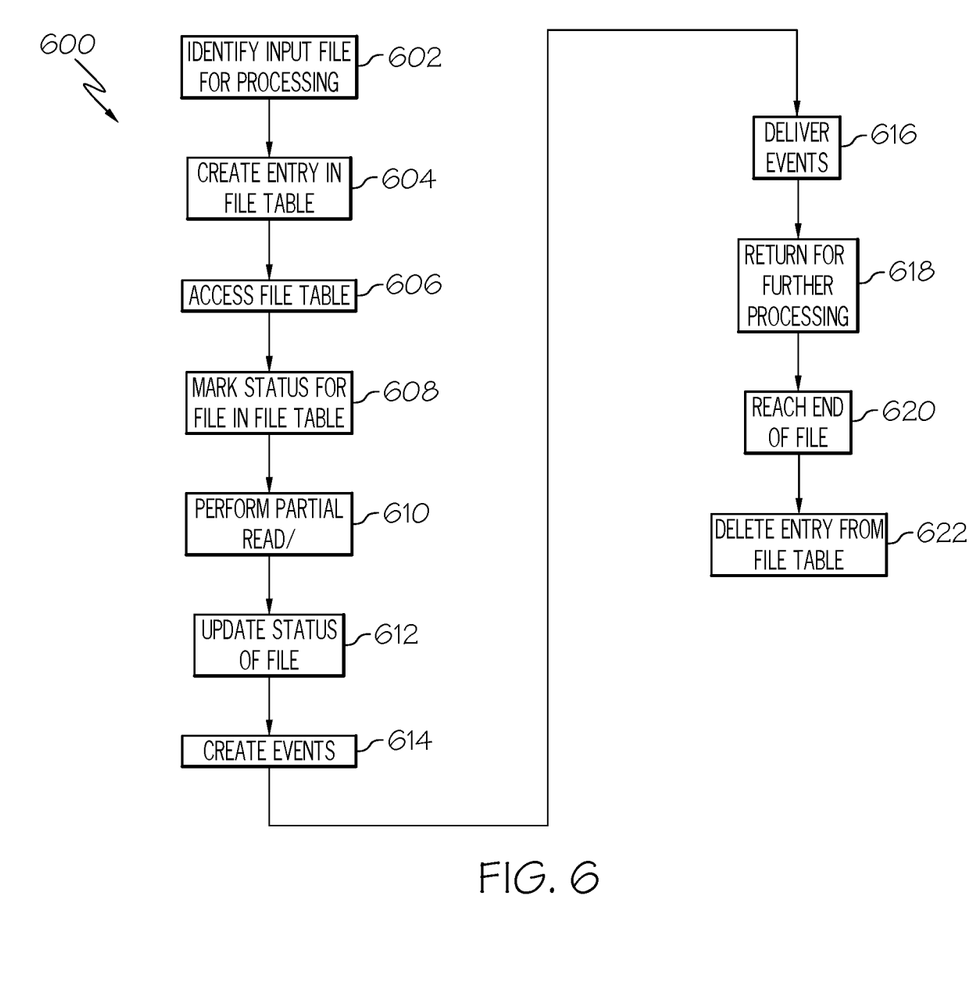
FIG. 6 illustrates a flowchart for offset sharing of an input file according to embodiments.

FIG. 6 depicts a flowchart 600 for offset sharing of an input file according to the disclosed embodiments. For clarity, reference may be made to elements of FIG. 5 and Tables 2 and 3 in disclosing FIG. 6, but FIG. 6 is not limited by the embodiments shown in FIG. 5 and Tables 2 and 3. As an example, input file may include 100 business objects (BOs).

Step 602 executes by identifying input file 116 for processing. Step 604 executes by creating an entry in file table 502. An adapter 506 that identifies input file 116 for processing may create an entry in file table 502 (only if it does not already exist) with a status code of "0" and with the last BO count and last file pointer position as "0." This initial adapter 506 may be known as a manager, but is distinguishable from task manager 304 disclosed in FIG. 3.

Step 606 executes by accessing file table 502 by an adapter or instance to process contents of the file. These contents may be partial contents 302, or, in other words, parts of the overall file. An adapter 506 may select the partial content for reading from the file table entry.

Step 608 executes by marking a status for the partial content in file table 502. Just before adapter 506 starts to read the partial content of the file, it may mark the status of the file in file table 502 with a status code of "1." A partial content with a status code of "1" in file table 502 represents a virtual lock to the partial content, such that no other adapter 506 is allowed to pick up the same partial content for reading or processing.

Step 610 executes by performing a partial read of input file 116, or, in other words, reading partial content 302. The disclosed embodiments perform a partial read of the business objects as desired by the polling quantity. For example, if the polling quantity is 50 BOs, then adapter 506 should read 50 BOs from the file at any given time. Because the file is greater than 50 BOs, multiple reads will be made.

Step 612 executes by updating a status of the file. An adapter 506 that completes its reading as a partial read starting from the last file pointer position should update the status of the file as "2", and may update the last BO count as well as the last file pointer position at this step. Using the above example, the last BO count will be 50.

Step 614 executes by creating events for the BOs after file table 502 is updated. Step 616 executes by delivering those events by adapter 506 to the end point. Step 618 executes by returning to file table 502 for further processing. During a second polling cycle, adapter 506 may look for partial contents of the file with a status of "2" for further processing. Moreover, steps 606-612 may be repeated.

Step 620 executes by reaching an end of the file. In the given example, the last BO count of the file will be 100. Once the pointer reaches this value, then operations may cease as the file has been read by adapters 506. The status of the file may be marked as "3." Step 622 executes by deleting entry from file table 502. Once the status of "3" is reached, adapter 506 may delete the file entry from file table 502 after completion of delivery of all events. The file also may be archived in this step.

According to the disclosed embodiments, when dealing with large files, an adapter 506 is allowed to read only partial content of the file as required by the polling quantity. This is in contrast to reading the whole content of the file at one time, and storing the related information in a hash map, as done by known adapters. File table 502 stores one entry per file and thus allows for an efficient way to handle a file without taxing memory overhead. Because the disclosed process allow of a partial read of file content as required by the polling quantity, the number of BO records stored in-memory to generate events also is managed.

The disclosed embodiments enable an adapter 506 to process and deliver files of any size in an effective manner. It also provides a consistent performance within adapters when dealing with the size of a large file.

The disclosed embodiments also work in a clustered environment. In this environment, the disclosed process receives a large file in an event directory. With multiple adapter instances running in the cluster configuration, the disclosed process enables an adapter instance to process a partial read of the file content. An instance that reads the file will only hold a virtual lock to that file until the partial read is complete. Once the first instance completes the partial read, then a second adapter instance may start accessing the file content to partial read the file content for the next set of BOs while the first instance is performing the task of generating the events and delivering them to endpoints.

The disclosed embodiments also pertain to dealing with files that are marked for continuous updates. For a file marked for continuous updates, an adapter 506 may keep the file in the event directory without archiving the file even after completely processing and delivering the BOs. Adapter 506 may look for newly updated content at the end of the file to detect if any further processing is needed. Known approaches identify the BO position for the last read BO. This is a time consuming process that results in special code to interact with such files.

According to the disclosed embodiments, files marked for continuous updates are handled in a normal manner without the need for special code. When the end of the file is reached, the status of the file will not be marked with a status of "3," but will remain with a status of "2" to allow an adapter 506 to start reading the newly updated content during the next polling cycle.

According to the embodiments, methods are disclosed for locking partial content of a file for distribution of workload across different adapters or instances of a resource adapter, which independently handles the transaction specific to the locked partition of the file. The methods allow parallel access to parts of the files and distribute files across instances thereby avoiding the full file being locked for processing. Thus, multiple instances may access the same file but different parts, or partial content, at the same time.

The disclosed methods also may mask the adapter with a table, such as a task table, so that the resource adapter's direct interface to process is the table and not the file, as done in known adapters. Thus, access is indirect so that one adapter or instance is not charged with processing the entire file by itself.

The embodiments also disclose methods having a managing adapter or instance appointed by a task. The managing adapter synchronously keeps other adapters in the distribution of the work, but not as a master/slave model. The managing adapter does not directly distribute work to the other adapters, but through the table. The disclosed methods maintain the managing adapter or managing task instance that overlooks the processes creating the tasks for other instances in the cluster and to distribute non-duplicating events. This feature allows parallel access to the file by various instances and distributes the load in a high availability manner.

The managing adapter also maintains a division of accessing the file and processing the file. Partial content is read, and still read even with other parts of the file are being handled. The other part may be ready to deliver to the end point. The managing adapter may create a managing task and switch to be a member of the cluster.

The embodiments provide task definition, instance evolution among tasks and division in the data structure, which rolls over the task distribution table for recovery. Task definitions are removed when the surrounding tasks have a completed status. High availability maintenance is provided where the work distribution is checked for completion. Another independent instance may pick up slow processing tasks apart from the serial order in the table.

The embodiments also disclose methods for distributing file content by having an offset, or file, table that helps in distributing the content without duplication of effort, status management of the file for successive archival tasks, and processing of the tasks. The disclosed methods provide content distribution by saving offsets of the file and allowing access to adapter instances in a parallel manner. The disclosed methods also incorporate user configuration data to enable a data driven mechanism for file access, work distribution and partial processing.

The disclosed methods also include delivering events to the end point as quickly as possible by reading and processing the files based on the offset within the table. Thus, the disclosed methods are capable of handling files of any size by reducing memory overhead of the resource adapters. The disclosed methods being resilience to the cluster configuration and allows dynamic addition and removal of adapter instances to the runtime. Moreover, the disclosed embodiments enable a single instance to adopt a high availability work load configuration without explicit conditions or additional code.

While it is understood that the process software for work distribution and management in a high availability cluster environment of resource adapters may be deployed by manually loading directly in the client, server and proxy computers via loading a storage medium such as a CD, DVD, etc., the process software for implementing the disclosed embodiments also may be automatically or semi-automatically deployed into a computer system by sending the process software to a central server or a group of central servers. The process software is then downloaded into the client computers that will execute the process software.

Alternatively, the process software may be sent directly to the client system via email. The process software is then either detached to a directory or loaded into a directory by a button on the email that executes a program that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server and then it will be stored on the proxy server.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process.

The descriptions of the various embodiments of the present invention have been presented for purposes of illustration, but are not intended to be exhaustive or limited means. Many modifications and variations will be apparent to those of ordinary women hard without departing from the scope and spirit of the described above. The terminology used herein was chosen to best explain the principles of the embodiments, the practical application or technical improvements over technologies found in the marketplace, or to enable others of ordinary skill in the art to understand the embodiments disclosed herein.

What is claimed is:

1. A process of computer file management comprising:
storing the present status of a plurality of input files in a file table;
using the file table to process one or more of the input files across a computing environment;
configuring the file table to allow only partial reading of each of the input files of the plurality of input files;
delivering one or more objects from one or more of the input files to a database; and
processing business objects from one or more of the input files as desired by a polling entity to the database.

2. The process of claim 1 wherein the computing environment is clustered.

3. The process of claim 1 wherein the computing environment is nonclustered.

4. The process of claim 1 further comprising:
after delivering one or more objects from one or more of the input files to a database, tracking an object count and a last file pointer position reached after the partial read.

5. The process of claim 1 wherein the database is a database persistence model configured for a clustered environment with multiple instances.

6. The process of claim 1 further comprising:
partially reading an input file and updating a file status when an end of file (EOF) is reached.

7. The process of claim 6, further comprising:
before partially reading the input file, marking the status of the file with a code indicative of a virtual lock to partial content of the input file.

8. The process of claim 1 further comprising:
after processing business objects updating the status of an input file from the one or more input files where the business object was located.

9. The process of claim 1 further comprising:
performing a partial read of objects in the one or more input files until a previously identified quantity of objects is read.

10. A system for computer file management comprising:
one or more processors, one or more computer-readable memories, one or more computer-readable tangible storage media, and program instructions stored on at least one of the one or more tangible storage media for execution by at least one of the one or more processors via at least one of the one or more memories, wherein the computer system comprises:
a computer accessible file table configured to store the present status of a plurality of input files;
a resource adapter cluster configured to use the file table to process one or more of the input files across a computing environment, wherein the resource adapter cluster is further configured to process business objects from one or more of the input files as desired by a polling entity to the database;
the file table further configured to allow only partial reading of each of the input files of the plurality of input files; and
a database for receipt of one or more objects from one or more of the input files.

11. The system of claim 10 wherein the computing environment is clustered.

12. The system of claim 10 wherein the computing environment is nonclustered.

13. The system of claim 10 wherein the resource adapter cluster is further configured to track an object count and a last file pointer position reached after the partial read after delivering one or more objects from one or more of the input files to a database.

14. The system of claim 10 wherein the database is configured as a database persistence model for a clustered environment with multiple instances.

15. The system of claim 10 wherein the resource adapter cluster is further configured to partially read an input file and update a file status when an end of file (EOF) is reached.

16. The system of claim 15 wherein the resource adapter cluster is further configured such that before partially reading the input file, the status of the file with a code indicative of a virtual lock to partial content of the input file is marked.

17. The system of claim 10 wherein the resource adapter cluster is further configured such that after processing business objects, the status of an input file from the one or more input files where the business object was located is updated.

18. The system of claim 10 wherein the resource adapter cluster is further configured such that a partial read of objects in the one or more input files is performed until a previously identified quantity of objects is read.

* * * * *